United States Patent
Lee et al.

(10) Patent No.: US 12,422,818 B2
(45) Date of Patent: Sep. 23, 2025

(54) STACK VISUALIZATION METHOD, APPARATUS, AND COMPUTER-READABLE RECORDING MEDIUM STORING INSTRUCTIONS TO PERFORM STACK VISUALIZATION METHOD

(71) Applicant: Research & Business Foundation Sungkyunkwan University, Suwon-si (KR)

(72) Inventors: Sang Won Lee, Suwon-si (KR); Hyewon Shin, Suwon-si (KR); Young Woon Choi, Suwon-si (KR); Su Jong Kim, Suwon-si (KR); Jiho Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 430 days.

(21) Appl. No.: 17/982,628

(22) Filed: Nov. 8, 2022

(65) Prior Publication Data

US 2023/0145246 A1    May 11, 2023

(30) Foreign Application Priority Data

Nov. 8, 2021 (KR) .......................... 10-2021-0152176

(51) Int. Cl.
*G05B 19/4069* (2006.01)
*G05B 19/416* (2006.01)

(52) U.S. Cl.
CPC ........ *G05B 19/4069* (2013.01); *G05B 19/416* (2013.01)

(58) Field of Classification Search
CPC ........ B23K 15/00; B22F 3/008; B22F 3/1055; B22F 10/00; B22F 10/20; B22F 10/25; B22F 10/28; B29C 64/153; G05B 19/4097; G05B 19/41885; G05B 2219/45104
USPC ......................................................... 700/182
See application file for complete search history.

(56) References Cited

U.S. PATENT DOCUMENTS

| | | | |
|---|---|---|---|
| 6,815,636 B2 * | 11/2004 | Chung | B33Y 10/00 219/121.65 |
| 10,048,661 B2 * | 8/2018 | Arthur | G05B 19/401 |
| 10,933,468 B2 * | 3/2021 | Jones | B29C 64/393 |
| 2017/0252812 A1 * | 9/2017 | Mykulowycz | B22F 1/08 |
| 2018/0304370 A1 * | 10/2018 | Myerberg | G05B 19/4099 |
| 2021/0299788 A1 * | 9/2021 | Kobayashi | B23K 26/36 |

(Continued)

FOREIGN PATENT DOCUMENTS

| | | | | |
|---|---|---|---|---|
| CN | 109070200 A | * | 12/2018 | ............ B22F 1/0062 |
| CN | 111168067 B | * | 7/2021 | .............. B22F 10/00 |

(Continued)

*Primary Examiner* — Ronald D Hartman, Jr.
(74) *Attorney, Agent, or Firm* — NSIP Law (57) ABSTRACT

There is a stack visualization method using a stack visualization apparatus including a deposition head. The method comprises collecting a moving speed of the deposition head; collecting laser power information of the deposition head by which a laser is irradiated to a stack; selecting a virtual stack corresponding to the moving speed of the deposition head and the laser power information among a plurality of previously stored virtual stacks based on the moving speed of the deposition head and the laser power information; and visualizing the selected virtual stack through a digital twin model.

9 Claims, 7 Drawing Sheets

(56) References Cited

U.S. PATENT DOCUMENTS

| | | | | |
|---|---|---|---|---|
| 2021/0318673 A1* | 10/2021 | Kitchen | ............... | G05B 13/048 |
| 2022/0043421 A1* | 2/2022 | Wittwer | ................. | B23K 26/00 |
| 2022/0161329 A1* | 5/2022 | Tsai | ....................... | B22F 10/80 |
| 2022/0219239 A1* | 7/2022 | Elwany | ................. | B22F 10/368 |
| 2023/0042539 A1* | 2/2023 | Jones | ..................... | B33Y 50/02 |

FOREIGN PATENT DOCUMENTS

| | | | | | |
|---|---|---|---|---|---|
| CN | 109937387 B | * | 8/2022 | ............... | B22F 10/20 |
| CN | 116822098 B | | 1/2024 | | |
| CN | 116449771 B | * | 2/2024 | ........... | G05B 19/414 |
| EP | 1466718 A2 | * | 10/2004 | ........... | B29C 64/153 |
| EP | 2585249 B1 | * | 2/2017 | ........... | B23K 1/0056 |
| EP | 2585248 B1 | * | 10/2017 | ........... | B23K 1/0056 |
| FR | 3039444 A1 | * | 2/2017 | | |
| KR | 10-2018-0118692 A | | 10/2018 | | |
| KR | 10-2019-0061017 A | | 6/2019 | | |
| WO | WO-2018228919 A1 | * | 12/2018 | | |
| WO | WO-2021234973 A1 | * | 11/2021 | | |

* cited by examiner

STACK VISUALIZATION METHOD, APPARATUS, AND COMPUTER-READABLE RECORDING MEDIUM STORING INSTRUCTIONS TO PERFORM STACK VISUALIZATION METHOD

CROSS-REFERENCE TO RELATED APPLICATION

This application claims priority to Korean Patent Application No. 10-2021-0152176, filed on Nov. 8, 2021, in the Korean Intellectual Property Office, the entire disclosure of which is incorporated herein by reference for all purposes.

TECHNICAL FIELD

The embodiment relates to a stack visualization method and apparatus for visualizing a stack.

This work was supported by the National Research Foundation of Korea (NRF) grant funded by the Korea government (MSIT) (No. 2022R1A2C3012900), the Technology Innovation Program (20013794, Center for Composite Materials and Concurrent Design) funded by the Ministry of Trade, Industry & Energy (MOTIE, Korea) and the National Research Foundation of Korea (NRF) grant funded by the Korea government (MSIT) (No. 2018R1A2A1A05079477).

BACKGROUND

In general, the Directed Energy Deposition process is a representative metal 3D printing process. Different sizes of stacks are formed for each process condition by the correlation between various variables existing in the relevant process.

As such, stacks of different sizes are formed for each process condition. However, since the process is performed in a controlled environment that a user is unable to access due to the high energy heat source and metal powder used in the process, it is difficult to check the shape of a stack and the state during the process in real time.

Although there exists a stack shape simulation technology using computational analysis software and a thermo/hydrodynamic physics engine, there is an issue that it takes a lot of time to derive analysis results.

SUMMARY

As described above, in the process of the Directed Energy Deposition process, it is difficult to check the shape of a stack and the state during the process in real time in a real size or using simulation. Accordingly, there is a need for an apparatus or method that may quickly and directly check the shape of the stack and the state during the process.

An embodiment provides a stack visualization method and apparatus for visualizing a movement of real equipment and the shape of the stack in real time in a virtual space in conjunction with a digital twin model, and a computer-readable recording medium.

In accordance with an aspect of the present disclosure, there is provided a stack visualization method using a stack visualization apparatus including a deposition head, the method may comprise: collecting a moving speed of the deposition head; collecting laser power information of the deposition head by which a laser is irradiated to a stack; selecting a virtual stack corresponding to the moving speed of the deposition head and the laser power information among a plurality of previously stored virtual stacks based on the moving speed of the deposition head and the laser power information; and visualizing the selected virtual stack through a digital twin model.

The plurality of previously stored virtual stacks has different widths and heights which are respectively mapped onto pairs of different moving speeds of the deposition head and different values of the laser power information.

The stack visualization may comprise collecting thermal image information of the stack, wherein a state of the stack is monitored based on the thermal image information of the stack.

The stack visualization may comprise collecting position information of the deposition head and position information of a CNC machine; and visualizing the deposition head and the CNC machine through the digital twin model based on the position information of the deposition head and the position information of the CNC machine.

In accordance with another aspect of the present disclosure, there is provided a stack visualization apparatus including a deposition head, the apparatus may comprise: a memory; and a processor, wherein the processor is configured to collect a moving speed of the deposition head, collect laser power information by which a laser is irradiated to a stack, select a virtual stack corresponding to the moving speed of the deposition head and the laser power information among a plurality of previously stored virtual stacks in the memory based on the moving speed of the deposition head and the laser power information, and visualize the selected virtual unit stack through a digital twin model.

The plurality of previously stored virtual stacks has different widths and heights which are respectively mapped onto pairs of different moving speeds of the deposition head and different values of the laser power information.

The processor may be configured to collect thermal image information of the stack, wherein a state of the stack is monitored based on the thermal image information of the stack.

The processor may be configured to collect position information of the deposition head and position information of a CNC machine, and visualize the deposition head and the CNC machine through the digital twin model based on the position information of the deposition head and the position information of the CNC machine.

In accordance with another aspect of the present disclosure, there is provided a non-transitory computer-readable recording medium storing a computer program, which comprises instructions for a processor to perform a stack visualization method using a stack visualization apparatus including a deposition head, the stack visualization method may comprise: collecting a moving speed of the deposition head; collecting laser power information of the deposition head by which a laser is irradiated to a stack; selecting a virtual stack corresponding to the moving speed of the deposition head and the laser power information among a plurality of previously stored virtual stacks based on the moving speed of the deposition head and the laser power information; and visualizing the selected virtual stack through a digital twin model.

The plurality of previously stored virtual stacks has different widths and heights according to the moving speed of the deposition head and the laser power information of the deposition head.

The stack visualization method may comprise collecting thermal image information of the stack, wherein a state of the stack is monitored based on the thermal image information of the stack.

The stack visualization method may comprise collecting position information of the deposition head and position information of a CNC machine; and visualizing the deposition head and the CNC machine through the digital twin model based on the position information of the deposition head and the position information of the CNC machine.

An embodiment enables real-time shape prediction and visualization of a stack decided according to various process variable conditions and deposition paths.

In addition, as a process is performed in a controlled environment, an embodiment enables checking of the in-process situation and the stack result, which is difficult to check immediately, in real time through cyberspace.

In addition, an embodiment enables building of a real-time monitoring system for each process by applying the same to several processes for generating beads.

DETAILED DESCRIPTION

The advantages and features of the present disclosure and methods of achieving them will be apparent from the embodiments that will be described in detail with reference to the accompanying drawings. It should be noted, however, that the present disclosure is not limited to the following embodiments, and may be implemented in various different forms. Rather the embodiments are provided so that this disclosure will be thorough and complete and will fully convey the scope of the present disclosure to those skilled in the technical field to which the present disclosure pertains. It is to be noted that the scope of the present disclosure is defined only by the claims.

In describing the embodiments of the present disclosure, a detailed description of known functions or configurations will be omitted unless actually necessary. In addition, the terms used in the specification are defined in consideration of functions used in the embodiment of the present disclosure, and may be changed according to the intent or custom of operators or users. Accordingly, the definitions thereof should be understood on the basis of the entire description of the present specification.

The functional blocks shown in the drawings and described below are merely examples of possible implementations. Other functional blocks may be used in other implementations without departing from the spirit and scope of the detailed description. In addition, although one or more functional blocks of the present disclosure are represented as separate blocks, one or more of the functional blocks of the present disclosure may be combinations of various hardware and software configurations that perform the same function.

In addition, the expression that includes certain components is an open-type expression and merely refers to existence of the corresponding components, and should not be understood as excluding additional components.

Moreover, it will be understood that when a component is referred to as being "connected to" or "coupled to" another component, it may be directly connected or coupled to the other component or intervening components may be present.

In addition, expressions such as "first, second," etc. are used only for distinguishing a plurality of configurations, and do not limit the order or other characteristics between the configurations.

The terms "unit" and "-or/er" described in the specification indicate a unit for processing at least one function or operation, which may be implemented by hardware, software or a combination thereof.

Hereinafter, embodiments of the present disclosure will be described with reference to the accompanying drawings.

Figure 1:
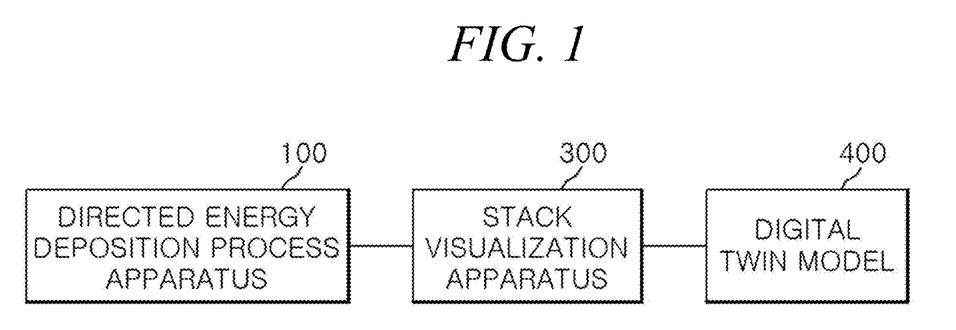
FIG. 1 is a block diagram illustrating a stack visualization system according to an embodiment.
Figure 2:
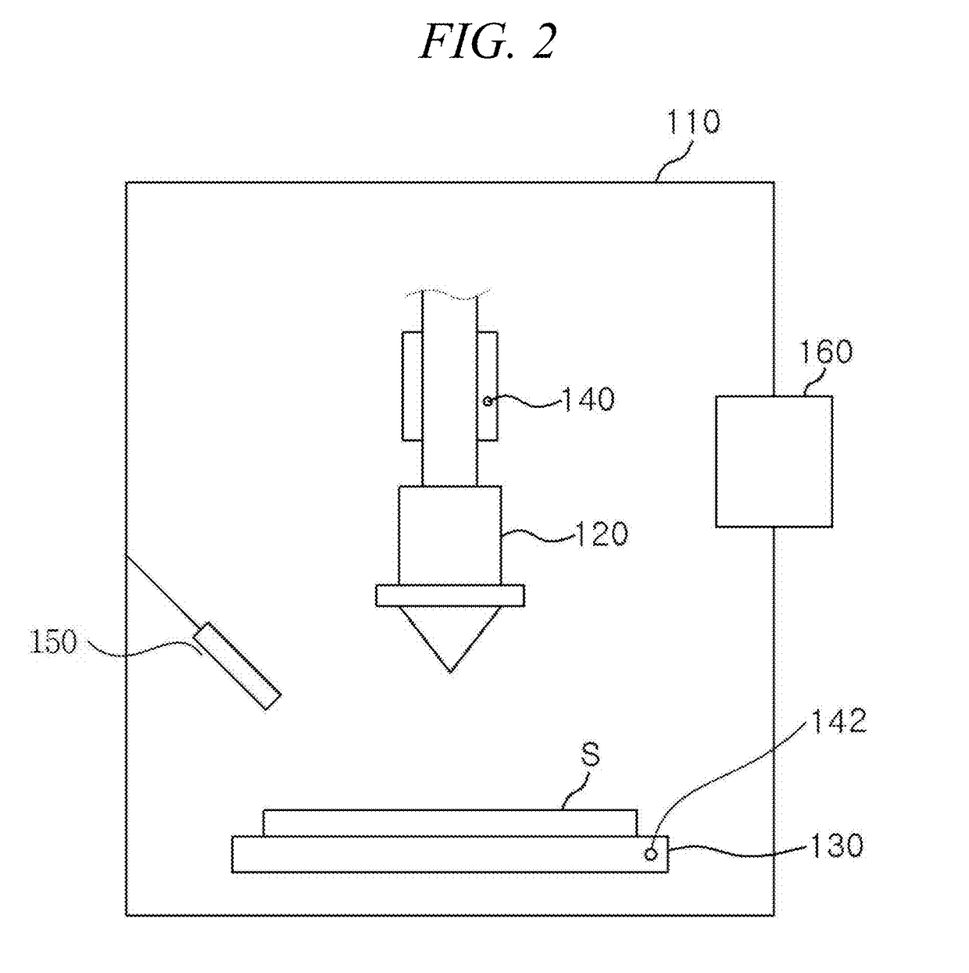
FIG. 2 is a schematic diagram illustrating a stack process apparatus according to an embodiment.
Figure 3:
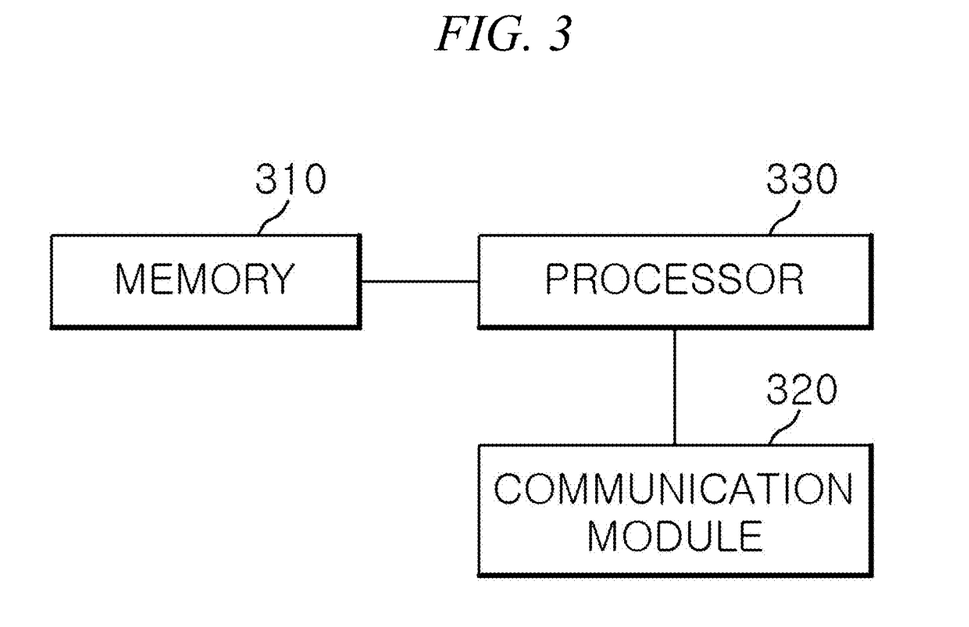
FIG. 3 is a block diagram illustrating a stack visualization apparatus according to an embodiment.
Figure 4:
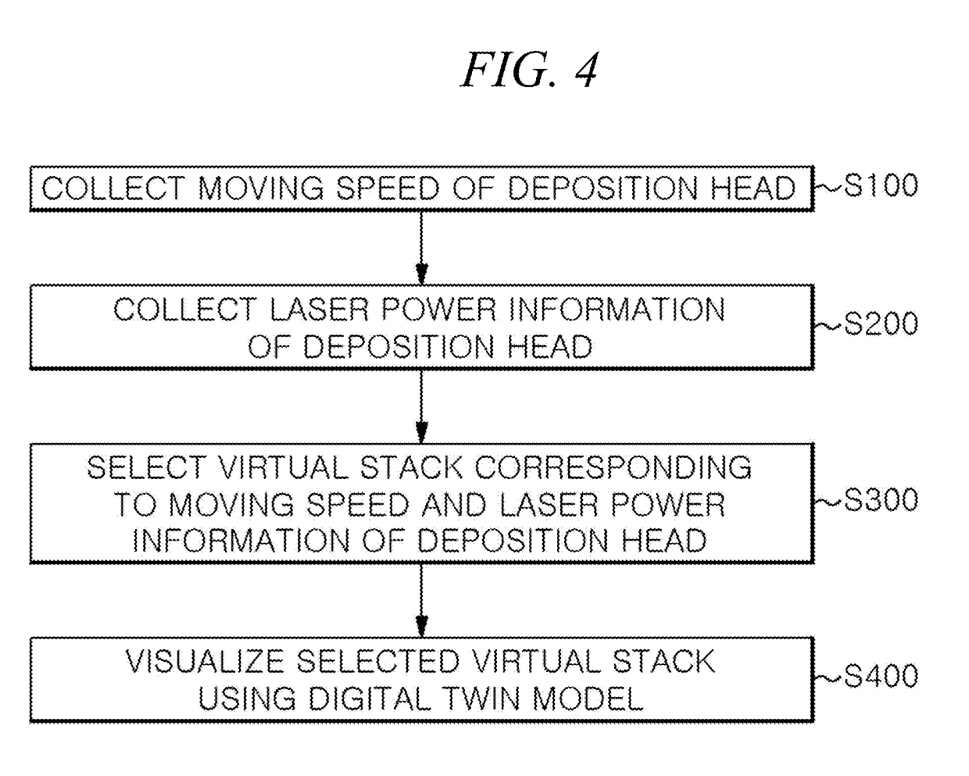
FIG. 4 is a flowchart illustrating a stack visualization method according to an embodiment.
Figure 5:
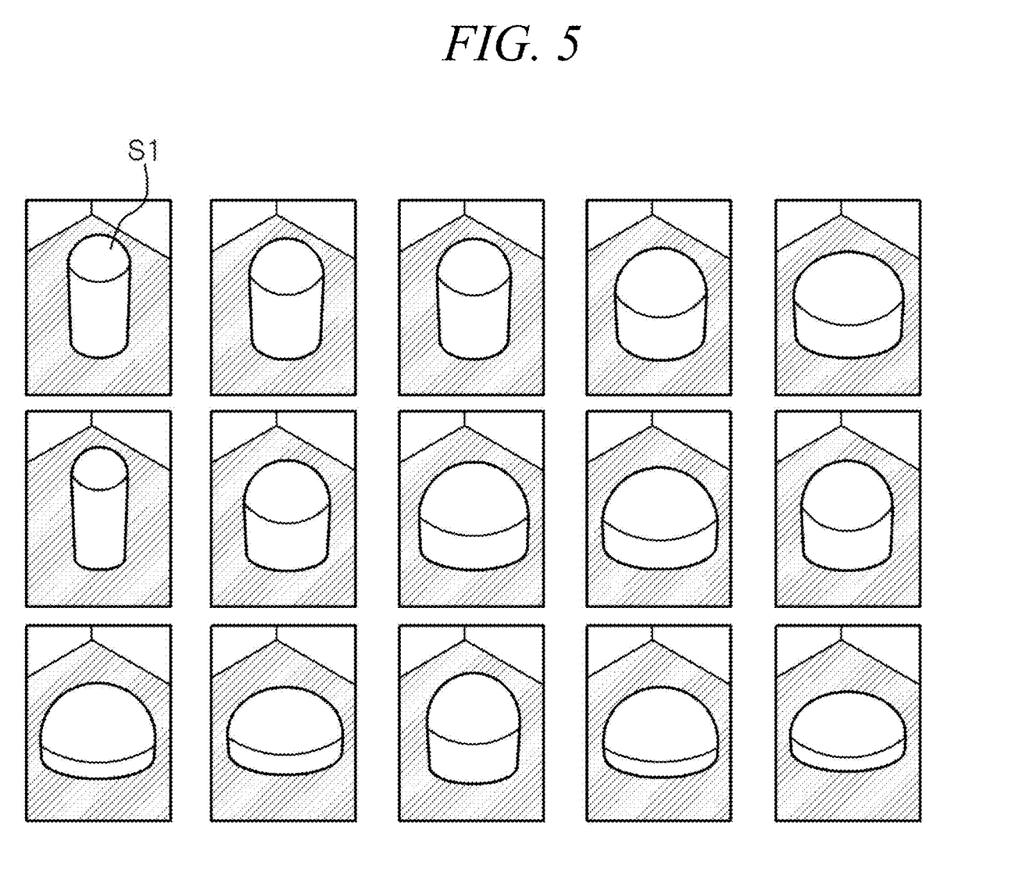
FIG. 5 is a diagram illustrating various shapes of a stack according to an embodiment.
Figure 6:
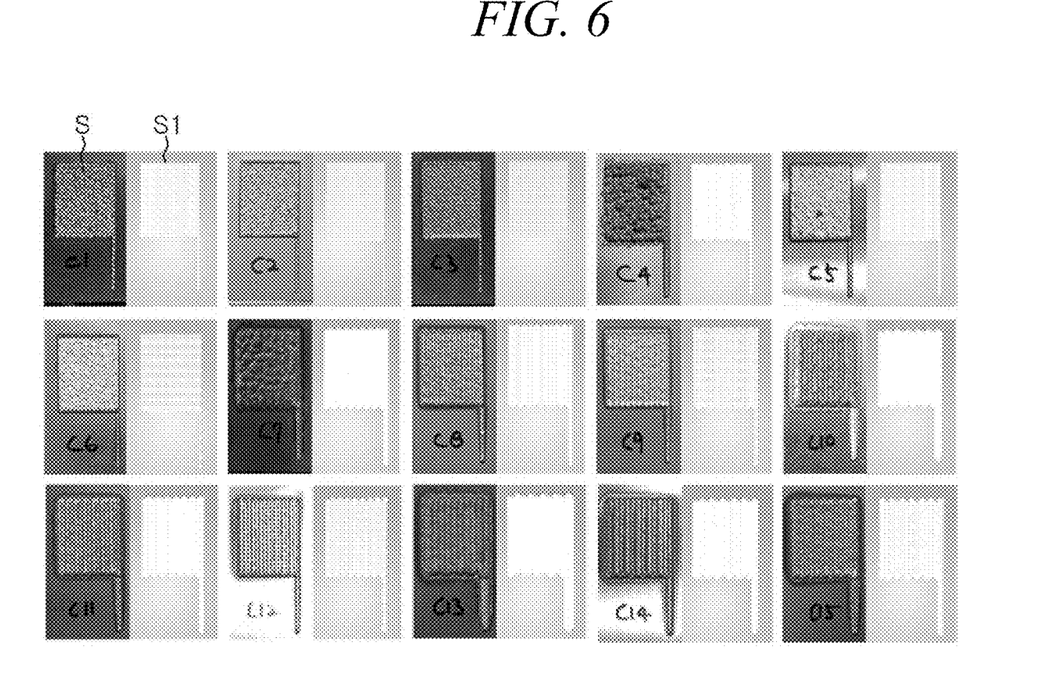
FIG. 6 is a diagram illustrating a virtual stack corresponding to the stack according to an embodiment.
Figure 7:
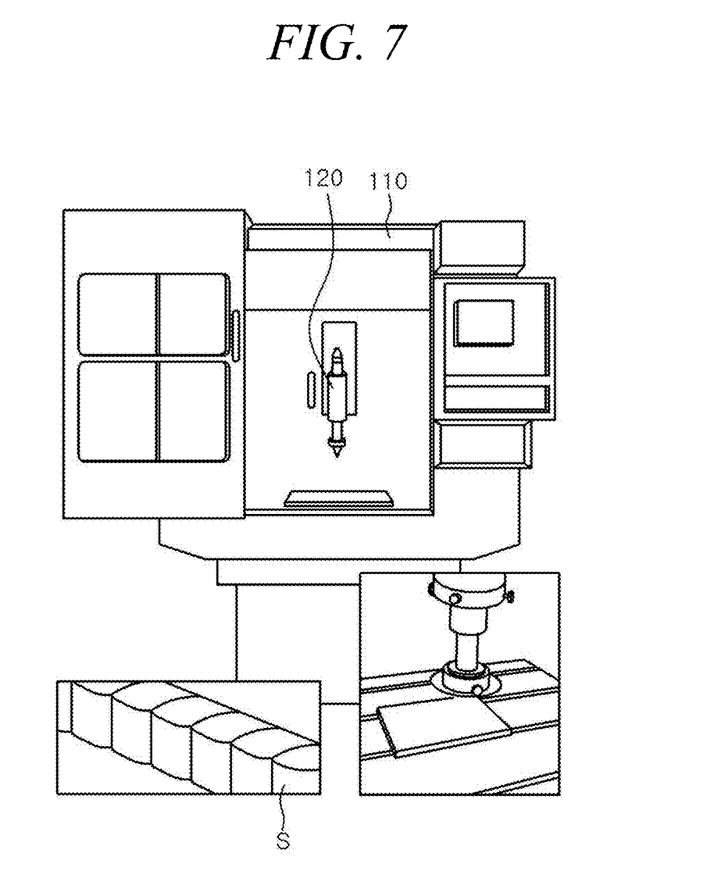
FIG. 7 is a diagram illustrating a state in which a virtual stack is visualized by the stack visualization apparatus according to an embodiment.

FIG. 1 is a block diagram illustrating a stack visualization system according to an embodiment. FIG. 2 is a schematic diagram illustrating the directed energy deposition process apparatus according to an embodiment. FIG. 3 is a block diagram illustrating a stack visualization apparatus according to an embodiment. FIG. 4 is a flowchart illustrating a stack visualization method according to an embodiment. FIG. 5 is a diagram illustrating various shapes of a stack according to an embodiment. FIG. 6 is a diagram illustrating a virtual stack corresponding to the stack according to an embodiment. FIG. 7 is a diagram illustrating a state in which a virtual stack is visualized by the stack visualization apparatus according to an embodiment.

Referring to FIG. 1, a stack visualization system according to an embodiment may include a directed energy deposition process apparatus 100, a digital twin model 200, and a stack visualization apparatus 300.

The directed energy deposition process apparatus 100 may be an apparatus for a 3D printing process using metal. The stack visualization apparatus 300 may visualize the directed energy deposition process apparatus and a stack through the digital twin model 200 based on data required from the directed energy deposition process apparatus 100.

As illustrated in FIG. 2 the directed energy deposition process apparatus 100 may include a CNC machine 110, a deposition head 120, a work bed 130 supporting a stack S, a G-code 160, and a sensor unit.

The CNC machine 110 may include a storage space and operating machines in the storage space, but the configuration is not limited thereto. The deposition head 120 may move on the work bed 130 to form the stack S within the CNC machine 110. The work bed 130 may be a space in which the directed energy deposition process of the stack S is performed.

The sensor unit may include a plurality of sensors. The sensor unit may include position sensors 140 and 142 for measuring position information, and a thermal image sensor 150 for capturing the stack.

The position sensor may include a first position sensor 140 disposed on one side of the deposition head 120 and a second position sensor 142 attached to one side of the work bed 130. The first position sensor 140 may measure information (position and movement information) in the X and Z axis directions of the deposition head 120. The first position sensor 140 may be moved together according to the moving direction of the deposition head 120. The second position sensor 142 may measure information of the Y-axis direction (position and movement information) of the work bed 130. The thermal image sensor 150 may monitor the status of the stack S production process. The thermal image sensor 150 may sense the temperature and shape of the stack S.

In addition, the sensor unit may be further provided with a separate sensor for measuring the on-off state of the laser and laser power, but is not limited thereto.

The G-code 160 may be linked with valid data (laser on/off, laser power, coordinate type, moving direction and speed, path type, etc.) among the data collected from the sensor unit, and may be used to visualize the real-time position and shape of the components of the directed energy deposition process apparatus 100 and the stack S in the virtual space construction environment.

Returning to FIG. 1, the stack visualization apparatus 300 may visualize the components of the actual the directed energy deposition process apparatus 100 and the stack S through the digital twin model 200 in real time. Herein, the digital twin model 200 may include a simulation model that implements and outputs real-space objects (buildings, mechanical devices, objects, etc.) in a digital virtual space in real time. Based thereon, the stack visualization apparatus 300 may use the digital twin model 200 to display the mechanical device of the directed energy deposition process apparatus 100 and the stack S produced therethrough in real time in a virtual space.

As illustrated in FIG. 3, the stack visualization apparatus 300 may include a memory 310, a communication module 320, and a processor 330.

The memory 310 may store various pieces of data for an operation of visualizing the components of the directed energy deposition process apparatus 100 and the stack S. Specifically, the memory 310 may store a plurality of application programs driven by the stack visualization apparatus 300, data and instructions for the operation of the stack visualization apparatus 300.

In addition, the memory 310 may store various pieces of sensor information measured by the directed energy deposition process apparatus 100. The memory 310 may store valid data provided from the G-code. For example, information such as laser on/off, laser power information, coordinate type, position of the deposition head, moving direction, speed, and path type may be stored.

In addition, the memory 310 may store the shape of the virtual stack with respect to the actual stack S according to process variables. The process variable may include, but is not limited to, information on the moving speed of the deposition head and laser power.

The communication module 320 may be a device including hardware and software necessary for transmitting and receiving signals such as control signals or data signals through wired/wireless connection with other network devices.

The communication module 320 may transmit/receive values measured by the stack visualization apparatus 300 to/from another network device.

The communication module 320 may perform communication using 3G, LTE, and 5G, as well as low power wireless network (LPWN) and low power wide area network (LP-WAN) such as NB-IoT, LoRa, SigFox, and LTE-CAT1.

The communication module 320 may perform communication using a communication method using a wireless LAN such as Wi-Fi 802.11a/b/g/n as well as a wired local area network (LAN). In addition, the communication module 320 may perform communication with an external device using a communication method such as NFC and Bluetooth.

Herein, the communication module 320 is not an essential configuration of the stack visualization apparatus 300, and may be mounted or unmounted in the stack visualization apparatus 300 as necessary.

The processor 330 is a kind of central processing unit and may control the overall operation for visualizing the components and the stack of the directed energy deposition process apparatus.

As illustrated in FIG. 4, the processor 330 may collect the moving speed of the deposition head in real time (S100). The processor 330 may collect information from the G-code or the sensor unit.

The processor 330 may collect laser power information of the deposition head in real time (S200). The processor 330 may collect information from the G-code or the sensor unit.

The processor 330 may select a virtual stack corresponding to the moving speed and laser power information of the deposition head from among the virtual stacks stored in the memory 310 based on the moving speed and laser power information of the deposition head collected in real time (S300).

Specifically, the dome shape may appear differently depending on the moving speed of the deposition head and laser power information. Based thereon, a dome-shaped virtual stack S1 having a width and a height which are respectively mapped onto pairs of different moving speeds of the deposition head and different values of the laser power information of the deposition head may be set in the memory 310. For example, the virtual stack S1 may be exemplified as illustrated in FIG. 5.

Based on the above description, the processor 330 may select the virtual stack S1 corresponding to the moving speed and laser power information of the deposition head collected in real time from the memory 310 (S300).

The processor 330 may control the selected virtual stack S1 to be visualized through the digital twin model 200 (S400). For example, as illustrated in FIG. 6, when the stack S is generated by the directed energy deposition process apparatus 100, the processor 330 may configure the shape of the virtual stack S1 by reflecting the width and height of the virtual stack S1 selected in phase S300.

In this connection, the processor 330 may control to visualize the CNC machine and the deposition head of the directed energy deposition process apparatus using the position and moving speed information of the CNC machine and the deposition head.

As illustrated in FIG. 7, the processor 300 may visualize the stack together with the CNC machine and the deposition head on a separate display device.

The processor 330 may further collect thermal image information of the stack, and may monitor the actual state of the stack based on the thermal image information.

The aforementioned embodiments of the present disclosure may be implemented through various ways. For example, the embodiments of the present disclosure may be implemented by hardware, firmware, software, or a combination thereof.

In a hardware configuration, the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc.

that performs the functions or operations described above. A computer program in which a software code or the like is recorded may be stored in a computer-readable recording medium or a memory unit and driven by a processor. The memory unit is located at the interior or exterior of the processor and may transmit and receive data to and from the processor via various known ways.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A stack visualization method using a stack visualization apparatus including a CNC machine, wherein the CNC machine contains a deposition head, the method comprising:
    determining, by a processor, a moving speed of the deposition head, position information of the deposition head, and position information of the CNC machine in real time;
    determining, by the processor, laser power information of the deposition head by which a laser is irradiated to a stack in real time;
    selecting, by the processor, a virtual stack corresponding to the determined moving speed of the deposition head and the determined laser power information among a plurality of previously stored virtual stacks based on the determined moving speed of the deposition head and the determined laser power information; and
    detecting and displaying the selected virtual stack through a digital twin model via a display device in real time,
    wherein, during the displaying the selected virtual stack, the CNC machine and the deposition head are further displayed through the digital twin model via the display device in real time, based on the position information of the deposition head, and the position information of the CNC machine.

2. The method of claim 1, wherein the plurality of previously stored virtual stacks have different widths and different heights which are respectively mapped onto pairs of different moving speeds of the deposition head and different values of the laser power information of the deposition head.

3. The method of claim 1, further comprising determining thermal image information of the stack, wherein a state of the stack is monitored based on the thermal image information of the stack.

4. A stack visualization apparatus, comprising:
    a CNC machine including a deposition head;
    a display device;
    a memory; and
    a processor,
    wherein the processor is configured to determine a moving speed of the deposition head, position information of the deposition head, and position information of the CNC machine in real time, determine laser power information of the deposition head by which a laser is irradiated to a stack in real time, select a virtual stack corresponding to the moving speed of the deposition head and the laser power information among a plurality of previously stored virtual stacks in the memory based on the determined moving speed of the deposition head and the determined laser power information, and detect and display the selected virtual stack through a digital twin model via the display device in real time,
    wherein the processor is further configured to display the CNC machine and the deposition head through the digital twin model via the display device in real time, based on the position information of the deposition head, and the position information of the CNC machine.

5. The apparatus of claim 4, wherein the plurality of previously stored virtual stacks have different widths and different heights which are respectively mapped onto pairs of different moving speeds of the deposition head and different values of the laser power information of the deposition head.

6. The apparatus of claim 4, wherein the processor is configured to determine thermal image information of the stack, wherein a state of the stack is monitored based on the thermal image information of the stack.

7. A non-transitory computer-readable storage medium storing computer executable instructions, wherein the instructions, when executed by a processor, cause the processor to perform a stack visualization method using a stack visualization apparatus including a CNC machine, wherein the CNC machine contains a deposition head, the method comprising:

determining, by the processor, a moving speed of the deposition head, position information of the deposition head, and position information of the CNC machine in real time;

determining, by the processor, laser power information of the deposition head by which a laser is irradiated to a stack in real time;

selecting, by the processor, a virtual stack corresponding to the determined moving speed of the deposition head and the determined laser power information among a plurality of previously stored virtual stacks based on the determined moving speed of the deposition head and the determined laser power information; and detecting and displaying the selected virtual stack through a digital twin model via a display device in real time, wherein, during the displaying the selected virtual stack, the CNC machine and the deposition head are further displayed through the digital twin model via the display device in real time, based on the position information of the deposition head, and the position information of the CNC machine.

8. The non-transitory computer-readable recording medium of claim 7, wherein the plurality of previously stored virtual stacks have different widths and different heights which are respectively mapped onto pairs of different moving speeds of the deposition head and different values of the laser power information of the deposition head.

9. The non-transitory computer-readable recording medium of claim 7, wherein the stack visualization method further comprises determining thermal image information of the stack, wherein a state of the stack is monitored based on the thermal image information of the stack.

* * * * *